(12) United States Patent
Daemen et al.

(10) Patent No.: US 8,964,975 B2
(45) Date of Patent: Feb. 24, 2015

(54) METHOD OF KEY DERIVATION IN AN INTEGRATED CIRCUIT

(75) Inventors: Joan Daemen, Overpelt (BE); Jean-Louis Modave, Ottignies (BE); Michel Dawirs, Wezembeek-Oppem (BE)

(73) Assignee: Proton World International N.V., Zaventem (BE)

( * ) Notice: Subject to any disclaimer, the term of this patent is extended or adjusted under 35 U.S.C. 154(b) by 0 days.

(21) Appl. No.: 13/615,251

(22) Filed: Sep. 13, 2012

(65) Prior Publication Data

US 2013/0077781 A1    Mar. 28, 2013

(30) Foreign Application Priority Data

Sep. 27, 2011   (FR) ...................................... 11 58595

(51) Int. Cl.
*H04L 9/00*    (2006.01)
*H04L 9/08*    (2006.01)

(52) U.S. Cl.
CPC .............. *H04L 9/003* (2013.01); *H04L 9/0861* (2013.01); *H04L 9/0891* (2013.01); *H04L 2209/12* (2013.01)

USPC ................................ 380/45; 380/44; 380/277

(58) Field of Classification Search
None
See application file for complete search history.

(56) References Cited

U.S. PATENT DOCUMENTS

| | | | | |
|---|---|---|---|---|
| 4,888,800 | A * | 12/1989 | Marshall et al. | 380/281 |
| 7,734,052 | B2 * | 6/2010 | Braskich et al. | 380/277 |
| 8,160,248 | B2 * | 4/2012 | Dellow | 380/44 |
| 8,386,800 | B2 * | 2/2013 | Kocher et al. | 713/189 |
| 2011/0038481 | A1 | 2/2011 | Modave et al. | |
| 2011/0271110 | A1 * | 11/2011 | Ohba et al. | 713/168 |

OTHER PUBLICATIONS

Schneier, Applied Cryptography, 1996, John Wiley & Sons, $2^{nd}$ Edition, p. 180.*
French Search Report and Written Opinion dated Jan. 30, 2012 from corresponding French Application No. 11/58595.

* cited by examiner

*Primary Examiner* — Minh Dinh
(74) *Attorney, Agent, or Firm* — Seed IP Law Group PLLC

(57) ABSTRACT

A method of derivation, by an electronic circuit, of a first key from a second key, wherein: at least one third key is derived from the second key and is used to derive the first key; and a value of a counter, representative of the number of first keys, conditions the derivation of a new value of the third key.

22 Claims, 2 Drawing Sheets

METHOD OF KEY DERIVATION IN AN INTEGRATED CIRCUIT

CROSS REFERENCE TO RELATED APPLICATIONS

This application claims the priority benefit of French patent application number 11/58595, filed on Sep. 27, 2011, which is hereby incorporated by reference to the maximum extent allowable by law.

BACKGROUND

1. Technical Field

Embodiments generally relate to electronic circuits and, more specifically, to circuits using encryption, signature, and other keys, derived from a master or basic key contained in the electronic circuit.

2. Discussion of the Related Art

Most electronic circuits using keys used by algorithms of signature or encryption, or other cryptographic elements, use key derivation mechanisms to limit the exposure (the number of uses) of a basic key of the circuit. Such techniques especially enable to repudiate (to consider as invalid) keys used too often or supposed to have been attacked, and to regenerate new keys for subsequent sessions. In particular, frequently, for each new session of a cryptographic process, the electronic circuit generates a session key by deriving the basic key.

A limitation of such mechanisms is that the basic key is exposed each time a session key is derived, which makes it indirectly sensitive to certain attacks such as, for example, side channel analyses of differential power analysis (DPA) type.

Further, if it is decided to limit the number of uses of the basic key, this also limits the number of session keys that may be derived for the circuit.

SUMMARY

An embodiment provides a key derivation mechanism which overcomes all or part of the disadvantages of usual mechanisms.

Another embodiment provides a solution limiting basic key exposures without for all this decreasing the number of sessions that may be envisaged for the circuit.

Thus an embodiment provides a method of derivation, by an electronic circuit, of a first key from a second key, wherein:

at least one third key is derived from the second key and is used to derive the first key;

a value of a counter, representative of the number of first keys, conditions the derivation of a new value of the third key.

According to an embodiment, a first most significant portion of the counter represents the number of uses of the second key.

According to an embodiment, a second least significant portion of the counter represents the number of uses of the third key.

According to an embodiment, at least one bit of the first portion of the counter is duplicated.

According to an embodiment, the entire first portion of the counter is duplicated.

According to an embodiment, the duplicated value is stored in a non-volatile memory.

According to an embodiment, a new value of the third key is generated when the value of the counter reaches a threshold.

According to an embodiment, a new value of the third key is generated when the least significant bit of the first portion of the counter differs from the duplicated value.

According to an embodiment, several third keys are used by being derived from one another.

According to an embodiment, the counter is stored in a non-volatile memory.

According to an embodiment, at least the second and third keys are stored in a non-volatile memory.

Another embodiment provides an electronic circuit capable of implementing the above method.

The foregoing and other objects, features, and advantages will be discussed in detail in the following non-limiting description of specific embodiments in connection with the accompanying drawings.

DETAILED DESCRIPTION

Figure 1:
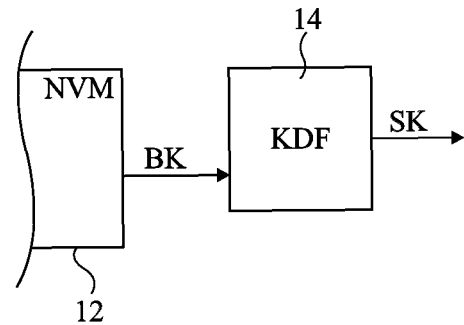
FIG. 1 is a simplified block diagram of a key derivation mechanism.

The same elements have been designated with the same reference numerals in the different drawings. For clarity, only those steps and elements which are useful to the understanding of the discussed embodiments have been described. In particular, the destination of the generated session keys has not been detailed, the described embodiments being compatible with current uses of session keys in various cryptographic algorithms. Further, mechanisms for generating and storing a basic key in an electronic circuit have not been detailed either, the described embodiments being here again compatible with usual mechanisms.

Session keys derived from a master key or basic key of an integrated circuit have multiple uses, be it in microcircuit cards, in radio frequency identification circuits (RFID), in various electronic circuits implementing cryptographic mechanisms, etc.

FIG. 1 is a block diagram partially illustrating a usual example of an electronic circuit equipped with a key derivation mechanism. A basic key (BK) is stored in a non-volatile memory 12 (NVM) of the electronic circuit. This basic key is used by a key derivation function 14 (KEY DERIVATION FUNCTION—KDF), which provides a session key (SK) to the circuit intended to use it. Currently, for each new session or when there is a need to change the session key, the basic key is extracted from the non-volatile memory to derive a new session key.

Figure 2:
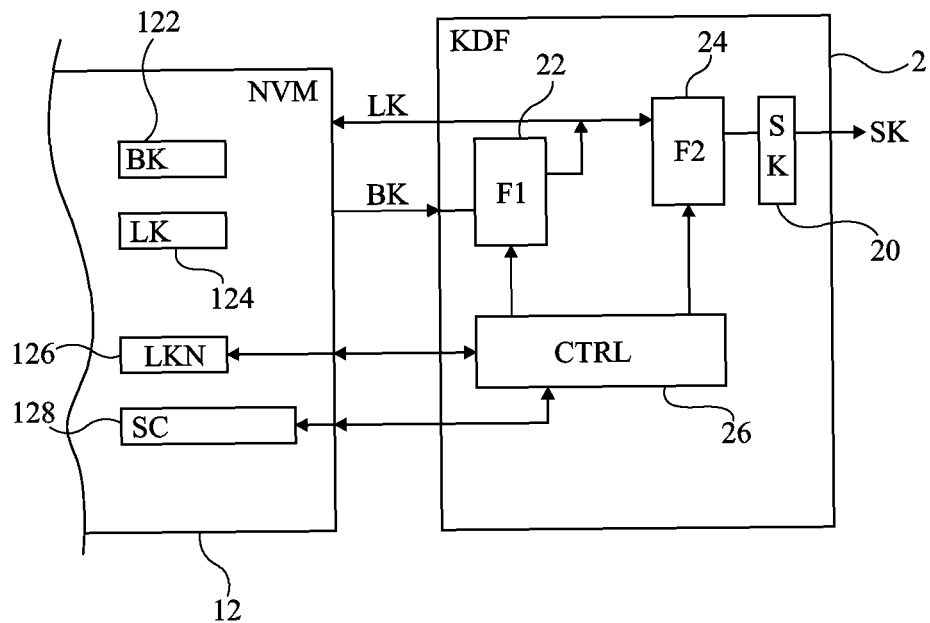
FIG. 2 is a more detailed block diagram of an embodiment of a key derivation mechanism.

FIG. 2 is a block diagram of an embodiment of a key derivation mechanism.

As previously, a basic key (BK) is stored in an area 122 of a non-volatile memory (NVM) 12 and this basic key is used by a key derivation mechanism 2 (KDF).

According to the embodiment shown in FIG. 2, basic key BK is used by a first derivation function 22 (F1) which generates a key, arbitrarily called link key LK. This link key is, on the one hand, stored in the non-volatile memory in area 124 and, on the other hand, submitted to a second key derivation function 24 (F2) to provide a session key SK. Session key SK is, for example, stored in a volatile memory area 20, for example, a register or the like. Session key SK is provided to the rest of the electronic circuit for a use which is current per se. Functions F1 and F2 may be identical.

The key derivation mechanism is controlled by software or hardware means. FIG. 2 schematically shows a block 26 (CTRL) for controlling the mechanism. Block 26 synchronizes the key derivation functions and organizes the key reading and storage in the non-volatile memory.

In a simplified embodiment, a new link key is generated as soon as a threshold number of uses of the current link key has been reached. Providing a link key or intermediate key between the basic key and the session key limits the number of exposures of the basic key without decreasing the number of possible session keys.

A session key counter SC is stored in a non-volatile memory area. The most significant bits of this counter represent number LKN of link keys, that is, the number of uses of basic key BK to derive link keys, and are duplicated in another non-volatile memory area 126.

Figure 3:
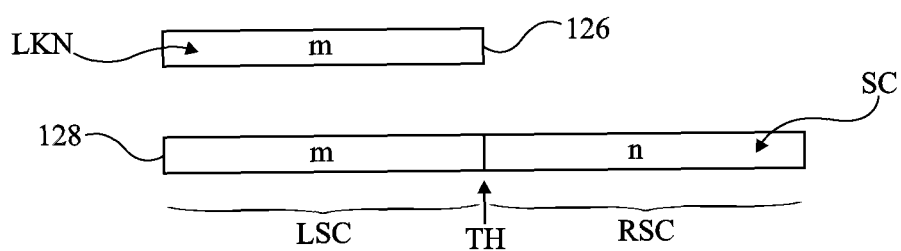
FIG. 3 illustrates an embodiment of counters of a key derivation mechanism.

FIG. 3 very schematically illustrates a preferred embodiment of counter SC. Said counter comprises m+n bits, with n least significant bits representing the number of session keys per link key (low or right-hand portion RSC of counter SC) and m most significant bits representing the number of link keys for the basic key (high or left-hand portion LSC of counter SC). Number (or count) LKN stored in area 126 thus comprises m bits duplicated from the session counter. Session counter SC thus comprises a number of bits corresponding to the sum of the number of bits representative of the number of uses of a link key and of the number of bits representative of the number of link keys. Numbers m and n may be equal or different.

Counter SC may in practice be formed of two counters respectively representing counts RSC and LSC, counter LSC being incremented when counter RSC returns to zero after having reached value $2^n+1$.

According to another variation, number LKN is stored with link key LK in area 124.

In the embodiment of FIG. 3, threshold TH for starting a new link key derivation corresponds to the state switching (to 0 or to 1) of the least significant bit of high portion LSC of counter SC.

Figure 4:
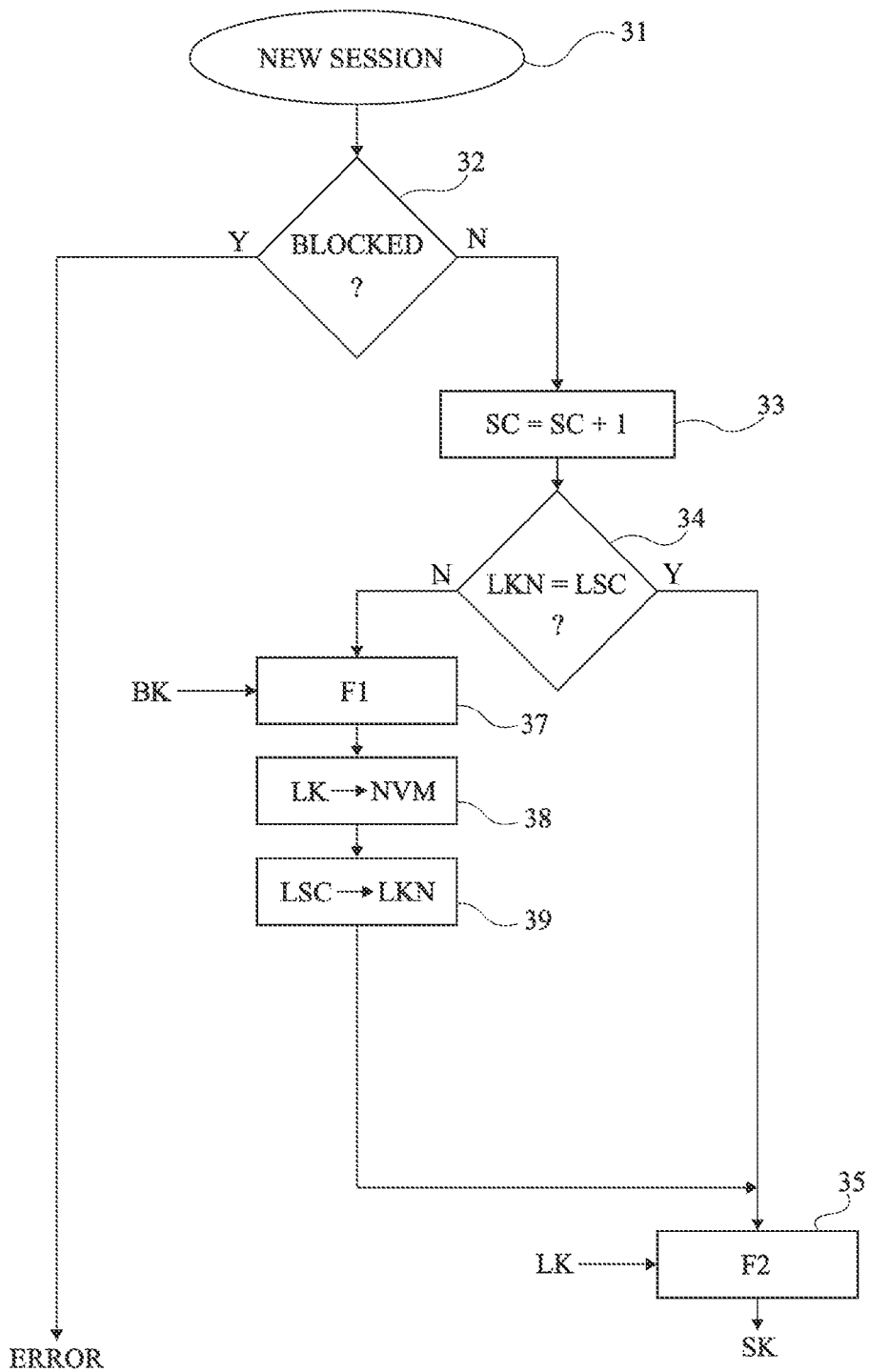
FIG. 4 is a simplified flowchart of an implementation mode of a key derivation mechanism.

FIG. 4 is an example of a process implemented from the mechanism of FIG. 2.

For each new session (block 31, NEW SESSION), the mechanism starts by verifying whether the key is blocked (block 32, BLOCKED?). Such a situation occurs if, in a previous session, the mechanism has considered that the circuit had a problem at the key generation level and that it had to be blocked. An example of such a process will be discussed later on. In case of a blocking (output Y of block 32), the mechanism returns an error (ERROR). This error may be processed by replacing the basic key after an external action on the circuit, by turning-off the circuit, or by any other action or error processing usual when a key cannot be used.

If the circuit is not blocked (output N of block 32), session counter SC is incremented (block 33, SC=SC+1). It is then checked (block 34, LKN=LSC?) whether link key LK stored in the non-volatile memory is coherent with the value of the session counter, that is, if value LKN which has been stored with the current link key (on generation of the current link key) has the same value as high portion LSC (m most significant bits) of the session counter.

If it has (output Y of block 34), this means that the link key can still be used. The current link key is then submitted to second derivation function F2 (block 35) and generates a session key SK.

If it has not (output N of block 34), that is, if the most significant bits of the session counter do not correspond to value LKN stored in the non-volatile memory, this means that the link key should be replaced. Basic key BK is then extracted from the non-volatile memory to be used by derivation function F1 (block 37). New session key LK is then stored in the non-volatile memory (block 38, LK ->NVM).

Number LKN should be incremented. To achieve this, a transfer (block 39, LS ->LKN) of the value of high portion LSC of counter SC into area 126 storing number LKN is performed.

On the least significant bit side of counter SC, low portion RSC has been automatically reset (to zero) by the increment at block 33 (if, during the increment, the bit of rank n+1 has switched to 1 or 0, all bits of lower rank have switched to 0).

Then, a session key is derived (block 35) from the new link key.

The derivation of a link key from the basic key is thus conditioned by most significant bits LSC of the session counter.

Taking as an arbitrary example a 20-bit session counter (m+n=20) where 10 bits form the link key counter, a total one million sessions can be carried out. A link key is used to derive 1,024 successive session keys and there will be a total 1,024 link keys. As a result, the basic key is used at most 1,024 times and each link key is also used at most 1,024 times. However, the number of session keys remains one million, and the number of times that the basic key and that each link key is used is the square root of the total number of sessions (in the case where m is equal to n).

The above-described principle may be generalized to more than two levels by using more than two link key levels. With p levels, the number of uses of the basic key and of each link key is, at most, a power –p of the total number of sessions when a same number of bits of counter SC is associated with each of the p levels.

However, the higher the number of link keys, the more non-volatile memory areas have to be used to store the counters and the corresponding link keys.

A session key may be used several times. For example, an additional counter counts the number of uses of the current session key, or least significant bits are added to counter SC.

In a simplified embodiment, the session key counter is compared with a threshold and when this threshold has been reached, a new session key is generated from the current link key. Similarly, the number of link keys is compared with a threshold, and when this threshold has been reached, a new link key is generated from the basic key.

According to an alternative embodiment, storage space 126 of number LKN is reduced to the two least significant bits of high portion LSC of the session counter. The system then behaves as follows. If these two bits correspond to the least significant bits (ranks n+1 and n+2) of high portion LSC of the session counter, the link key may be used for the current transaction. If the least significant bit (rank n+1) does not correspond but the other bit (rank n+2) corresponds, this means that the link key has expired (has been used a sufficient number of times) and that a new link key should be generated. If the two bits do not correspond, this means that there is a problem and the circuit should be blocked. Test 32 corresponds, for example, to a test on these two bits or to a test on a flag bit indicative of the need for a blocking.

According to another alternative embodiment, storage space 126 of number LKN is decreased to one bit (or to a few bits for redundancy reasons) into which is transferred the (or the few, typically less than ten) least significant bit(s) of the link key counter, which are preferably stored at the same time as the link key (in area 124). Session counter SC still contains m+n bits.

The system then behaves as follows. If bit LKN corresponds to the bit of rank n+1 of the session counter, the link key may be used for the current transaction. Otherwise, this means that a problem, for example, an attack, has occurred since the generation of the link key. Indeed, at the last generation of the link key, the value of counter SC has been incremented and bit LKN has been transferred into area 126. If this bit is different at the next iteration, this means that a link key has effectively been derived (step 37), but that the process has been stopped before it was recorded (or before area 126 has been updated if value LKN is stored separately from key LK).

The above mechanism may advantageously be used to protect the circuit against fault-injection attacks.

A threshold is then provided on the least significant bits (portion RSC) of the session counter to detect a possible piracy. If the least significant bit of the most significant bits of the session key counter (bit of rank n+1) is different from the least significant bit of link key LK (the bit representing LKN is assumed to be stored as a least significant bit in area 124), the right-hand portion (least significant bits) of the session counter is then examined. For example, the value of portion RSC is compared with a threshold. It can be considered that, if the threshold has been exceeded, this means that there have been many power supply failures with the previous key and that an attack, for example by differential power analysis, is likely to be going on. The circuit is then stopped.

In the opposite case, a new link key is derived from the basic key and this link key and a copy of the least significant bit of the most significant bits of the session counter is written into the non-volatile memory.

Various embodiments have been described. Various alterations and modification will occur to those skilled in the art. In particular, the selection of the number of bits to be provided for the different counters depends on the application and on the number of session keys that may be envisaged.

Further, the selection of the number of levels of link keys here again depends on the application and on the desired granularity of use of the link keys.

Further, although an example with one basic key and one link key has been described, the embodiments transpose to the parallel or successive use of several basic keys and of several link keys and session keys.

Finally, the practical implementation of the described embodiments is within the abilities of those skilled in the art based on the functional indications given hereabove and by using hardware or software means generally available in electronic circuits.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of derivation of one or more first keys from a second key, the method comprising acts of:
    deriving, by an electronic circuit, at least one current third key from the second key; and
    deriving, by the electronic circuit, a first key from the at least one current third key, wherein:
        a value of a counter, representative of a number of first keys that have been derived, conditions a derivation of at least one new third key, and
        a first portion of the counter represents a number of uses of the second key, the first portion being a most signification portion of the counter.

2. The method of claim 1, wherein a second portion of the counter represents a number of uses of the at least one current third key, the second portion being a least signification portion of the counter.

3. The method of claim 1, wherein the counter is stored at a first memory location, and at least one bit of the first portion of the counter is duplicated at a second memory location different from the first memory location.

4. The method of claim 3, wherein the entire first portion of the counter is duplicated.

5. The method of claim 3, wherein the duplicated value is stored in a non-volatile memory.

6. The method of claim 3, wherein the at least one bit of the first portion of the counter is a least significant bit of the first portion of the counter, and wherein the at least one new third key is generated when a value of the least significant bit of the first portion of the counter differs from a value stored at the second memory location.

7. The method of claim 1, wherein the at least one new third key is generated when the value of the counter reaches a threshold.

8. The method of claim 1, wherein the at least one current third key comprises a sequence of intermediate keys, the first intermediate key being derived from the second key, each following intermediate key being derived from a preceding intermediate key.

9. The method of claim 1, wherein the counter is stored in a non-volatile memory.

10. The method of claim 1, wherein at least the second key and the at least one current third key are stored in a non-volatile memory.

11. An electronic circuit capable of implementing a method of derivation of one or more first keys from a second key, the method comprising acts of:
    deriving at least one current third key from the second key; and
    deriving a first key from the at least one current third key; wherein:
        a value of a counter, representative of a number of first keys that have been derived, conditions a derivation of at least one new third key, and
        a first portion of the counter represents a number of uses of the second key, the first portion being a most signification portion of the counter.

12. An electronic circuit configured to perform a method for deriving one or more session keys from a basic key, wherein the method comprises acts of:
    deriving at least one current link key from the basic key;
    deriving a session key from the at least one current link key;
    storing a counter that counts a number of session keys that have been derived from the basic key, wherein n least significant bits of the counter represent a number of session keys that have been derived from the at least one current link key, and wherein m most significant bits of the counter represent a number of link keys that have been derived from the basic key;
    determining, based on a counter value relating to a number of session keys that have been derived, whether at least one new link key is to be derived, the counter value being based on at least a portion of the counter;

determining whether the number of link keys that have been derived from the basic key exceeds a selected threshold; and stopping the electronic circuit if it is determined that the number of link keys that have been derived from the basic key exceeds the selected threshold.

13. The electronic circuit of claim 12, wherein the session key is a first session key, and wherein the method further comprises:

if it is determined that at least one new link key is to be derived, deriving at least one new link key from the basic key; and deriving a second session key from the at least one new link key.

14. The electronic circuit of claim 12, wherein a same function is used to derive the at least one current link key from the basic key and to derive the session key from the at least one current link key.

15. The electronic circuit of claim 12, wherein the selected threshold is a first selected threshold, and wherein the act of determining whether at least one new link key is to be derived comprises determining whether the number of session keys that have been derived from the at least one current link key exceeds a second selected threshold.

16. The electronic circuit of claim 12, wherein the at least one current link key comprises a sequence of current link keys, the first current link key being derived from the basic key, each following current link key being derived from a preceding currently link key.

17. The electronic circuit of claim 12, wherein the act of determining whether at least one new link key is to be derived comprises determining whether bit n+1 of the counter has switched from 0 to 1 or from 1 to 0.

18. The electronic circuit of claim 12, wherein the counter is stored at a first memory location, and wherein the method further comprises an act of:

storing, at a second memory location, a copy of one or more bits of the counter that are ranked higher than n.

19. An electronic circuit configured to perform a method for deriving one or more session keys from a basic key, wherein the method comprises acts of:

deriving at least one current link key from the basic key;
deriving a session key from the at least one current link key;
storing a counter that counts a number of session keys that have been derived from the basic key, wherein n least significant bits of the counter represent a number of session keys that have been derived from the at least one current link key, and wherein the counter is stored at a first memory location;

storing, at a second memory location, a copy of one or more bits of the counter that are ranked higher than n;

determining, based on a counter value relating to a number of session keys that have been derived, whether at least one new link key is to be derived, wherein the act of determining whether at least one new link key is to be derived comprises determining whether a value stored at the second memory location matches a value of the one or more bits of the counter; and if it is determined that the value stored at the second memory location does not matches the value of the one or more bits of the counter, deriving at least one new link key from the basic key.

20. The electronic circuit of claim 19, wherein the one or more bits consist of bit n+2 and bit n+1.

21. The electronic circuit of claim 19, wherein the one or more bits consist of bit n+1.

22. An electronic circuit configured to perform a method for deriving one or more session keys from a basic key, wherein the method comprises acts of:

deriving at least one current link key from the basic key;
deriving a session key from the at least one current link key;
storing a counter that counts a number of session keys that have been derived from the basic key, wherein n least significant bits of the counter represent a number of session keys that have been derived from the at least one current link key, and wherein the counter is stored at a first memory location;

storing, at a second memory location, a copy of one or more bits of the counter that are ranked higher than n;

determining, based on a counter value relating to a number of session keys that have been derived, whether at least one new link key is to be derived, the counter value being based on at least a portion of the counter;

determining whether a value stored at the second memory location matches a value of the one or more bits of the counter;

if it is determined that the value stored at the second memory location does not matches the value of the one or more bits of the counter, determining whether a number of link keys that have been derived from the basic key exceeds a selected threshold; and stopping the electronic circuit if it is determined that the number of link keys that have been derived from the basic key exceeds the selected threshold.

* * * * *